(No Model.) 2 Sheets—Sheet 1.

F. W. POOL.
TRICYCLE.

No. 396,892. Patented Jan. 29, 1889.

WITNESSES:

INVENTOR:
F. W. Pool
BY Munn & Co.
ATTORNEYS.

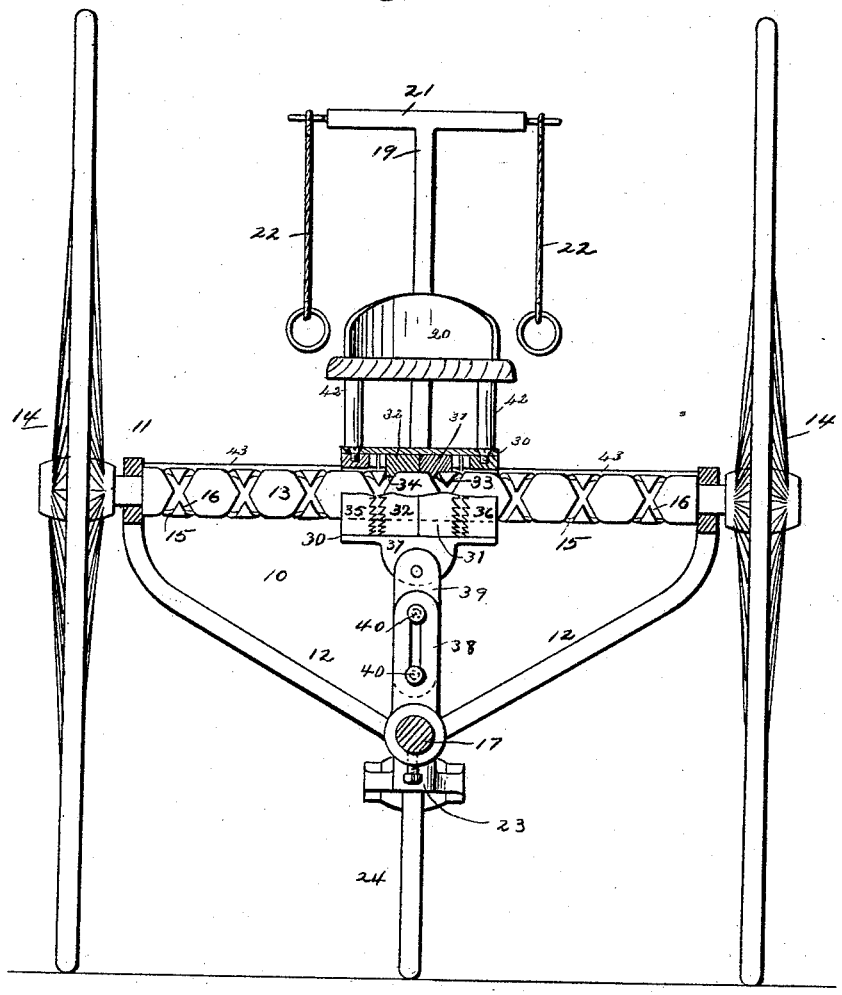

UNITED STATES PATENT OFFICE.

FRANCIS W. POOL, OF NORWICH, CONNECTICUT.

TRICYCLE.

SPECIFICATION forming part of Letters Patent No. 396,892, dated January 29, 1889.

Application filed June 9, 1888. Serial No. 276,578. (No model.)

*To all whom it may concern:*

Be it known that I, FRANCIS W. POOL, of Norwich, in the county of New London and State of Connecticut, have invented a new and Improved Tricycle, of which the following is a full, clear, and exact description.

My invention relates to an improvement in tricycles, and has for its object to so construct the same as that there will be little friction, and wherein the machine may be propelled at a high rate of speed with comparatively little exertion; and the further object of the invention is to provide a tricycle of simple and durable construction, and which may be conveniently manipulated.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
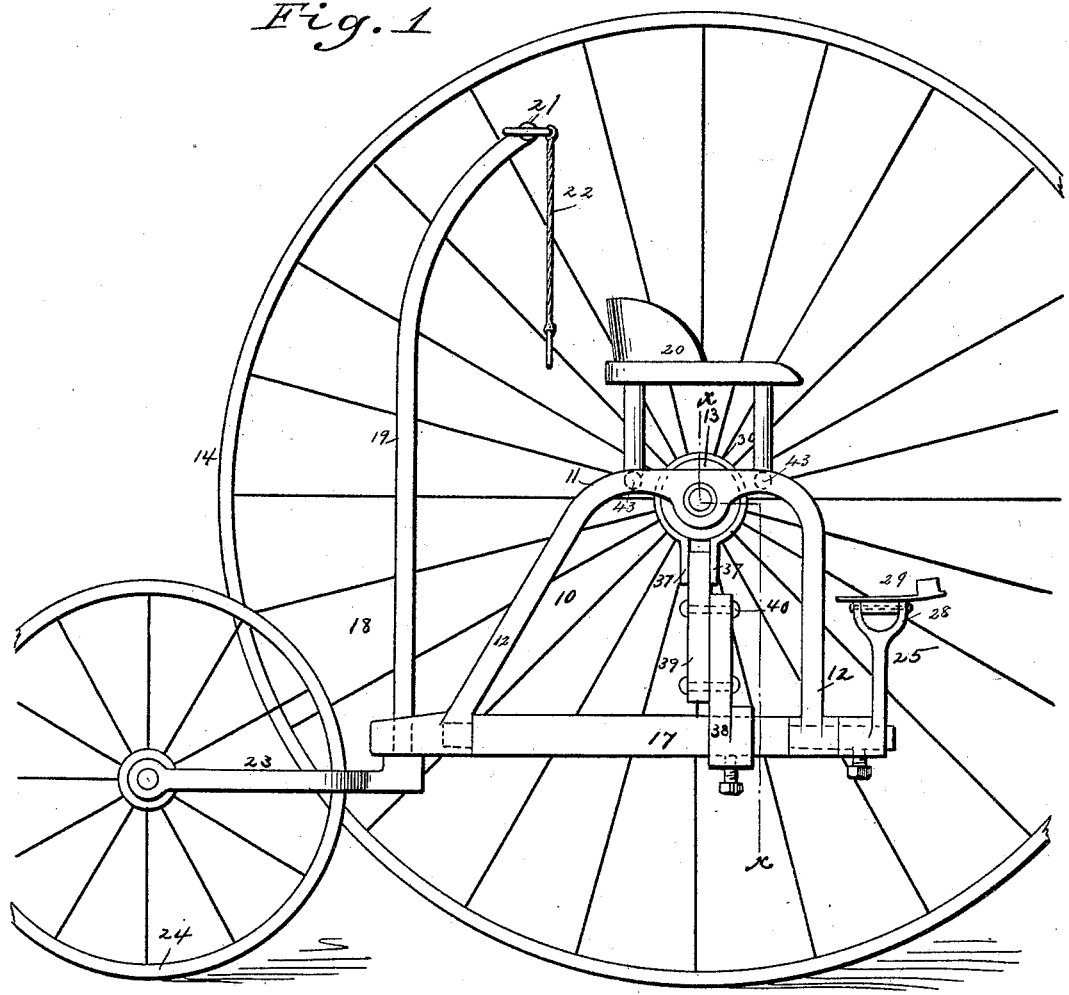
Figure 3:
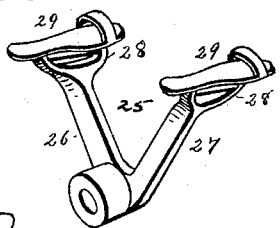

Figure 1 is a side elevation of the tricycle with one wheel removed. Fig. 2 is a section on line $x\ x$ of Fig. 1, and Fig. 3 is a perspective view of the propelling cranks or pedals.

In carrying out the invention the frame 10 consists of two spaced side pieces, 11, each provided with forwardly and rearwardly downwardly-extending arms 12, which arms are united upon a vertical line drawn centrally between the side pieces.

In the side pieces of the frame an axle, 13, is journaled, to each end of which a large wheel, 14, is rigidly secured, the said axle being provided with continuous circumferential right and left spiral grooves 15 and 16, as best shown in Fig. 2. In the lower aligning ends of the frame 10 a rock-shaft, 17, is journaled, extending from front to rear, or at right angles to the grooved axle 13.

Through the rear lower end of the frame the vertical member of an angle-bar, 18, is passed, adapted to turn therein, the said vertical member 19 constituting the steering-rod, and to that end is extended upward preferably above and to the rear of the seat 20, which latter is secured to cross-bars uniting the sides of the frame. The upper end of the steering-bar is provided with a T-handle, 21, and to the extremities of said handle ropes or cords 22 are attached, adapted to be grasped by the occupant of the seat, as best shown in Fig. 2.

The horizontal member 23 of the angle-bar 18 is bifurcated to receive the small rear wheel, 24. Upon the front projecting end of the rock-shaft 17 the pedal-carrier 25 is securely fastened, consisting of a single casting or forging embracing two arms, 26 and 27, radiating in opposite directions from an integral sleeve to essentially form a V, as best shown in Fig. 3.

The ends of the arms 26 and 27 are bifurcated, as shown at 28, and the pedals 29 are hinged thereto, the hinge-connection being effected by introducing a longitudinal sleeve attached to the under side of the pedals between the bifurcation of the arms and passing a bolt through said sleeve and bifurcated end. The pedals are usually shaped to the contour of a shoe-sole and are provided with toe-straps. When the pedal-carrier is secured upon the rock-shaft, the arms of the former extend upward a convenient distance in direction of the seat, as shown in Fig. 1, and the seat 20 is preferably so mounted that the rider will sit immediately over the center of the axle and near thereto. The supports for the seats consist of a series of short vertical posts, 42, secured to transverse braces 43, extending one at each side of the axle, parallel therewith, being attached at their extremities to the upper portion of the frame 10.

A traveling sleeve, 30, is held to slide upon the axle, consisting of a shell in which two abutting rings, 31 and 32, are loosely held, and the inner surface of each ring is provided with a spiral lug, 33 and 34, respectively, the lug 33 traveling in the right-hand spiral groove of the axle, and the other lug, 34, in the left-hand spiral groove, as best shown in Fig. 2.

The outer edges of the rings 31 and 32 are toothed to engage the contiguous toothed surface of rings 35 and 36, rigidly held one at each end of the shell. The shell of the sleeve 30 is cut longitudinally upon the under side and the central portion carried downward to form the ears 37.

A slotted arm, 38, is rigidly secured to the rock-shaft below the axle, and a slotted link, 39, is pivotally attached to the ears of the sleeve 30. The opposing faces of the arm and link are held to move in unison by suitable bolts, 40.

In operation, when the rock-shaft is carried to the left by pressure upon the left-hand pedal, the fixed ring 36, meshing with the loose ring 31, causes the lug 33 of the latter to travel in the right-hand groove, turning the axle, and consequently the wheels fixed thereon. When the rock-shaft is thrown to the right, the ring 31 is released and the opposing central ring, 32, engaged with the fixed ring 35, whereupon the lug 34, traveling in the left-hand groove, continues to revolve the axle in the same direction.

I desire it to be understood that, although specific constructions have been described, other equivalent constructions may be employed.

Having thus described my invention, what I claim as new, and desire to secure by Letters Patent, is—

1. In a tricycle, the combination, with a right and left hand spirally-grooved axle, of a rock-shaft at right angles to said axle, a sleeve traveling upon said axle, rings loosely held in the sleeve, provided with lugs entering the grooves, and a link connecting the rock-shaft and sleeve, substantially as shown and described.

2. In a tricycle, the combination, with a right and left hand spirally-grooved axle, drive-wheels rigidly secured to the same, and a rock-shaft at right angles to the axle, of a sleeve reciprocating upon the axle, rings loosely held in said sleeve, provided with lugs entering the grooves, a link connecting the rock-shaft and sleeve, and pedal-arms secured upon the rock-shaft, all as shown and described.

3. In a tricycle, the combination, with a right and left hand spirally-grooved axle, drive-wheels rigidly secured to the same, and a rock-shaft at right angles to the axle, of a clutch-carrying sleeve reciprocating upon the axle, rings loosely held in said sleeve, having lugs entering the axle-grooves, a compensating link uniting the rock-shaft and sleeve, and an essentially V-shaped pedal-carrier vertically secured to the said rock-shaft, substantially as shown and described.

4. In a tricycle, the combination, with a right and left hand spirally-grooved axle, drive-wheels fixed upon the same, and a rock-shaft at right angles to the axle, of a sleeve reciprocating upon the axle, toothed rings centrally and loosely held in said sleeve, having lugs entering the axle-grooves, toothed rings secured to the sleeve, compensating links uniting the rock-shaft and sleeve, and an essentially V-shaped pedal-carrier vertically secured upon said rock-shaft, substantially as shown and described.

FRANCIS W. POOL.

Witnesses:
GEORGE WILLIS KIMBALL,
EDGAR THEODORE KINGSLEY.